(12) United States Patent
Fukuta et al.

(10) Patent No.: US 8,137,861 B2
(45) Date of Patent: Mar. 20, 2012

(54) DIAPHRAGM FOR DIRECT-LIQUID FUEL CELL AND PROCESS FOR PRODUCING THE SAME

(75) Inventors: Kenji Fukuta, Shunan (JP); Hiroshi Inoue, Shunan (JP); Takenori Isomura, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 720 days.

(21) Appl. No.: 12/227,138

(22) PCT Filed: May 7, 2007

(86) PCT No.: PCT/JP2007/059474
§ 371 (c)(1),
(2), (4) Date: Nov. 7, 2008

(87) PCT Pub. No.: WO2007/129692
PCT Pub. Date: Nov. 15, 2007

(65) Prior Publication Data
US 2009/0208808 A1        Aug. 20, 2009

(30) Foreign Application Priority Data

May 9, 2006   (JP) .................................. 2006-130703
May 12, 2006  (JP) .................................. 2006-133972

(51) Int. Cl.
*H01M 8/10*       (2006.01)
*C08J 5/22*       (2006.01)
(52) U.S. Cl. .......................................... 429/492; 521/27
(58) Field of Classification Search ................ 429/450, 429/492; 521/27
See application file for complete search history.

(56) References Cited

U.S. PATENT DOCUMENTS

| 7,368,200 | B2 * | 5/2008 | Zhu et al. .................. 521/27 X |
| 2002/0001742 | A1 | 1/2002 | Katoh et al. |
| 2005/0112448 | A1 | 5/2005 | Nakamura et al. |

FOREIGN PATENT DOCUMENTS

| JP | 6-231781 A | 8/1994 |
| JP | 6-231783 A | 8/1994 |
| JP | 8-171920 A | 7/1996 |
| JP | 11-135136 A | 5/1999 |
| JP | 11-162485 A | 6/1999 |
| JP | 11-310649 A | 11/1999 |
| JP | 2001-135328 A | 5/2001 |
| JP | 2004-6306 A | 1/2004 |
| WO | WO 90/15393 | 11/1990 |

OTHER PUBLICATIONS

Supplementary European Search for Application No. 07742909.0 dated Feb. 3, 2010.

* cited by examiner

*Primary Examiner* — Stephen J. Kalafut
(74) *Attorney, Agent, or Firm* — Birch, Stewart, Kolasch & Birch, LLP (57) ABSTRACT

The present invention discloses a membrane for direct-liquid fuel cell, comprised of a layered cation-exchange membrane whose one side is constituted by A) a cation-exchange membrane layer of low water content type having a water content of 1 to 15% by mass at a relative humidity of 50% RH (25° C.) and whose other side is constituted by B) a cation-exchange membrane layer of high water content type having, at a relative humidity of 100% RH (25° C.), a water content which is higher, by 3% by mass ore more, than the water content of the cation-exchange membrane layer of low water content type at a relative humidity of 100% RH (25° C.), the layered cation-exchange membrane having an electrical resistance of 0.5 to 0.01 Ω·cm$^2$ in a 1 mol/L aqueous sulfuric acid solution at 25° C.

6 Claims, 3 Drawing Sheets

PRIOR ART

DIAPHRAGM FOR DIRECT-LIQUID FUEL CELL AND PROCESS FOR PRODUCING THE SAME

TECHNICAL FIELD

The present invention relates to a membrane for direct-liquid fuel cell and a process for producing the membrane.

BACKGROUND ART

Ion exchange membranes are in wide use as a membrane for cell (e.g. solid polymer fuel cell, redox flow cell or zinc-bromine cell), a membrane for dialysis, etc. Solid polymer fuel cell, which uses an ion exchange membrane as an electrolyte, is an electricity generation system in which a fuel and an oxidant are supplied into a cell continuously, they are reacted, and the resulting chemical energy is taken out as an electric power; and it is an electricity generation system which is clean and highly efficient. In recent years, the solid polymer fuel cell has increased its importance for uses in automobile, household and portable device because it can be operated at low temperatures and can be produced in a small size.

The solid polymer fuel cell has inside a solid polymer membrane which functions as an electrolyte, and the solid polymer membrane has, at each side, a bonded gas diffusion electrode having a catalyst loaded thereon. This cell works as a fuel cell when a fuel composed of hydrogen gas or an aqueous alcohol (e.g. methanol) solution is fed into a chamber (fuel chamber) in which one of the gas diffusion electrodes is present, an oxygen-containing gas as an oxidant (e.g. oxygen or air) is fed into a chamber in which the other gas diffusion electrode is present, and an external circuit is connected to the two gas diffusion electrodes. Of fuel cells, direct-liquid fuel cell which uses an aqueous alcohol (e.g. methanol) solution as a fuel, is easy to handle because the fuel is a liquid. Further, this fuel cell uses a fuel of low cost. Therefore, the direct liquid fuel cell is expected as an electric source of relatively small output used especially in portable devices.

Figure 3:
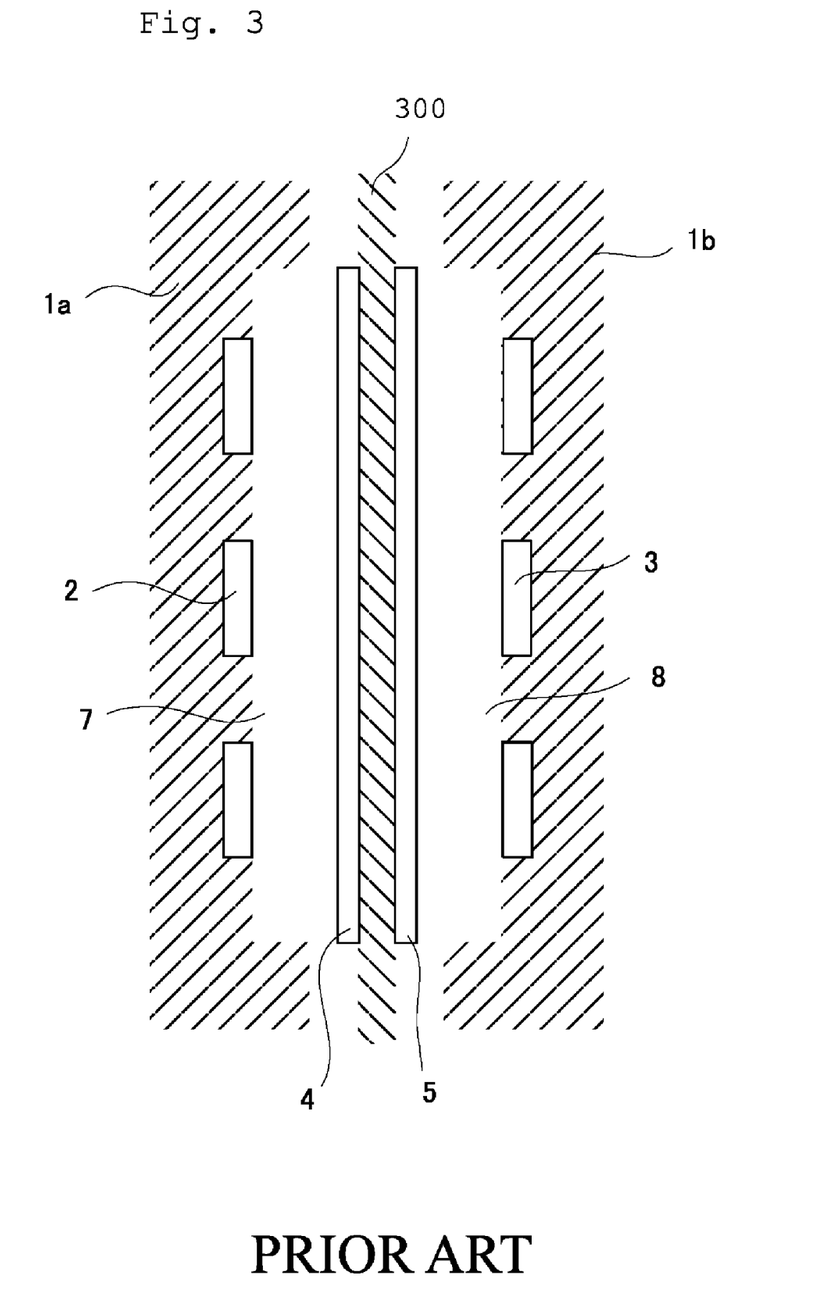
FIG. 3 is a conceptual drawing showing the fundamental structure of a conventional direct-liquid fuel cell.

The fundamental structure of direct-liquid fuel cell is shown in FIG. 3. In FIG. 3, 1a and 1b are each a partition wall of cell. The cell partition walls 1a and 1b are formed at the both sides of a solid polymer electrolyte membrane 300 used as a diaphragm so as to sandwich the solid polymer electrolyte membrane 300. 2 is a fuel passage formed in the inner wall of one cell partition wall 1a. 3 is an oxidant gas passage formed in the inner wall of other cell partition wall 1b. 4 is a diffusion electrode of fuel chamber side. 5 is a gas diffusion electrode of oxidant chamber side.

In this direct-liquid fuel cell, when a liquid fuel such as alcohol or the like is supplied into a fuel chamber 7, proton (hydrogen ion) and electron are generated from the liquid fuel by the catalyst possessed by the fuel chamber side diffusion electrode 4. The proton passes through the inside of solid polymer electrolyte membrane 300 and reaches an oxidant chamber 8, where the proton reacts with oxygen gas or with the oxygen in air, generating water. The electron generated at the fuel chamber side diffusion electrode 4 passes through an external circuit (not shown) and is sent to the oxidant chamber side gas diffusion electrode 5. At this time, the external circuit is provided with an electric energy.

In the direct-liquid fuel cell having the above-mentioned structure, there is ordinarily used a cation-exchange membrane as the above-mentioned membrane. The cation-exchange membrane is required to have properties of small electric resistance, high physical strength and low permeability to alcohol or the like used as a fuel. For example, when the membrane has a high permeability to alcohol, the alcohol in the fuel chamber diffuses into the oxidant chamber side, resulting in a reduced cell output.

As the cation-exchange membrane used as a membrane for fuel cell, there is, for example, one in which a porous membrane made of a polyolefin resin or a fluoroplastic is used as a base material. This cation-exchange membrane is produced by a method which comprises filling, in the pores of the base material, a polymerizable composition composed of a polymerizable monomer having a functional group into which a cation-exchange group can be introduced and a crosslinkable polymerizable monomer, polymerizing the polymerizable composition, and introducing a cation exchange group into the functional group into which a cation-exchange group can be introduced. The resulting membrane composed of a crosslinked polymer having a cation-exchange group can be produced at a relatively low cost, is small in electric resistance, is low in permeability to liquid fuel, and is low in the swelling and deformation caused by the fuel; therefore, the membrane is preferred (for example, Patent Literatures 1 and 2).

Patent Literature 1: JP2001-135328 A
Patent Literature 2: JP1999-310649 A

DISCLOSURE OF THE INVENTION

Task to Be Achieved by the Invention

Such a crosslinked, hydrocarbon-based cation-exchange membrane, however, is not low and unsatisfactory in permeability of liquid fuel (e.g. alcohol) therethrough when used as a membrane for direct-liquid fuel cell. Therefore, there is a problem of diffusion of liquid fuel into oxidant chamber side and reduction in cell performance. In order to alleviate this problem, the following methods have been investigated.

A method of reducing the porosity of a porous membrane used as a base material to lower the content of a cation-exchange resin filled in the pores of the porous membrane A method of increasing the content of a crosslinkable polymerizable monomer in the polymerizable composition used for production of cation-exchange resin, to reduce relatively the amount of hydrophilic, cation-exchange group introduced and, thereby, to allow the resulting cation-exchange membrane to have higher hydrophobicity and a higher crosslinking degree for a dense membrane.

These methods are effective for alleviation of the above problem to some extent. With these methods, however, there simultaneously arises other problem of increase in the electrical resistance of membrane and resultant reduction in cell output. Therefore, no membrane for direct-liquid fuel cell which is satisfactory in practical use, is obtained yet.

Under the above background, the present invention aims at providing a cation-exchange membrane usable as a membrane for direct-liquid fuel cell, which is extremely superior in non-permeability of liquid fuel, particularly methanol, maintains the electrical resistance at a low level, and can yield the cell output stably.

Means for Achieving the Task

The present inventors made a study in order to achieve the above task. As a result, it was found that, by using, as a membrane, a cation-exchange membrane (a layered cation-exchange membrane) whose each side is constituted by a cation-exchange membrane layer of different water content, i.e. a cation-exchange membrane layer of high or low water content type, the above task could be achieved. The finding has led to the completion of the present invention.

The present invention lies in a membrane for direct-liquid fuel cell, composed of a layered cation-exchange membrane whose one side is constituted by A) a cation-exchange membrane layer of low water content type having a water content of 1 to 15% by mass at a relative humidity of 50% RH (25° C.) and whose other side is constituted by B) a cation-exchange membrane layer of high water content type having, at a relative humidity of 100% RH (25° C.), a water content which is higher, by 3% by mass or more, than the water content of the cation-exchange membrane layer of low water content type at a relative humidity of 100% RH (25° C.), the layered cation-exchange membrane having an electrical resistance of 0.5 to 0.01 $\Omega \cdot cm^2$ in a 1 mol/L aqueous sulfuric acid solution at 25° C.

It is preferred that the membrane for fuel cell, when incorporated in a direct-liquid fuel cell, the cation-exchange membrane layer of low water content type A) is disposed at the oxidant chamber side of the cell and the cation-exchange membrane layer of high water content type B) is disposed at the fuel chamber side of the cell.

The present invention also lies in a process for producing the above-mentioned membrane for fuel cell, which comprises contacting a polymerizable composition containing a polymerizable monomer having a functional group into which cation-exchange group can be introduced or a cation-exchange group-containing polymerizable monomer, 0.5 to 40 mol %, relative to 100 mols of the polymerizable monomer, of a crosslinkable polymerizable monomer, and an effective amount of a polymerization initiator, with a layered porous membrane constituted by a low-porosity porous membrane having an average pore diameter of 0.005 to 10 μm and a porosity of 10 to 50% and a high-porosity porous membrane having an average pore diameter of 0.01 to 50 μm and a porosity higher, by 7% or more, than that of the low-porosity porous membrane to fill the polymerizable composition in the pores of the layered porous membrane, then polymerizing the polymerizable composition to obtain a layered porous membrane containing a cured resin, thereafter introducing a cation-exchange group into the cured resin as necessary.

The present invention further lies in a process for producing a membrane for fuel cell, which comprises hot-pressing a) a cation-exchange membrane of low water content type having a water content of 1 to 15% by mass at a relative humidity of 50% RH (25° C.) and an electrical resistance of 0.3 to 0.006 $\Omega \cdot cm^2$ in a 1 mol/L aqueous sulfuric acid solution at 25° C., and b) a cation-exchange membrane of high water content type having, at a relative humidity of 100% RH (25° C.), a water content higher by 3% by mass or more than that of the cation-exchange membrane of low water content type at a relative humidity of 100% RH (25° C.) and an electrical resistance of 0.2 to 0.004 $\Omega \cdot cm^2$ in a 1 mol/L aqueous sulfuric acid solution at 25° C.

Effect of the Invention

The membrane for fuel cell, of the present invention has, at the two sides, A) a cation-exchange membrane layer of low water content type and B) a cation-exchange membrane layer of high water content type; therefore, when used as a membrane for direct-liquid fuel cell, the membrane can maintains the electrical resistance at a low level and can reduce the permeability of liquid fuel, particularly of methanol to a large extent.

Specifically explaining, in the layered cation-exchange membrane of the present invention, the methanol permeability from the direction of cation-exchange membrane layer of high water content type B) to the cation-exchange membrane layer of low water content type A), in a 30 mass % aqueous methanol solution at 25° C. is ordinarily 500 g/m² hr or less and can be in a particular range of 300 to 10 g/m² hr; and the electrical resistance in a 1 mol/L aqueous sulfuric acid solution at 25° C. is 0.5 to 0.01 $\Omega \cdot cm^2$. Thus, the membrane for fuel cell, of the present invention has high non-permeability of liquid fuel and high proton conductivity, both of which have heretofore been unable to achieve.

The direct-liquid fuel cell produced using the present membrane is low in internal resistance, is highly suppressed in crossover of fuel (e.g. methanol), and accordingly can yield a high output.

BRIEF DESCRIPTION OF THE DRAWINGS

In these drawings, 1a and 1b are each a partition wall; 2 is a fuel passage; 3 is an oxidant gas passage; 4 is a fuel chamber side diffusion electrode; 5 is an oxidant chamber side diffusion electrode; 100, 200 and 300 are each a solid polymer electrolyte membrane; 7 is a fuel chamber; 8 is an oxidant chamber; 9 is a cation-exchange membrane layer of low water content type; 10 is a cation-exchange membrane layer of high water content type; and 11 is an intermediate layer.

BEST MODE FOR CARRYING OUT THE INVENTION

The layered cation-exchange membrane constituting the membrane for direct-liquid fuel cell, of the present invention has a layered structure whose one side is formed by A) a cation-exchange membrane layer of low water content type having a water content of 1 to 15% by mass at a relative humidity of 50% RH (25° C.) and whose other side is formed by B) a cation-exchange membrane layer of high water content type having, at a relative humidity of 100% RH (25° C.), a water content which is higher, by 3% by mass or more, than the water content of the cation-exchange membrane layer of low water content type at a relative humidity of 100% RH (25° C.).

When the layered cation-exchange membrane having the above structure is used as a membrane for direct-liquid fuel cell, the membrane can maintain the electrical resistance at a low level and yet can show a very low permeability to liquid fuel, particularly to methanol. These features are presumed to be brought about by the functions mentioned below.

That is, in a conventional direct-liquid fuel cell having a fundamental structure shown in FIG. 3, the fuel chamber 7 side surface layer of a membrane 300 composed of a cation-exchange membrane is in contact with a liquid fuel (e.g. an aqueous alcohol solution) containing a large amount of water. Therefore, this surface layer contains water absorbed and is in a wet state. Meanwhile, the oxidant chamber 8 side surface layer of the membrane 300 is in contact with an oxygen-containing gas (e.g. the air) taken in. Therefore, this surface layer is in a dry state. Thus, in the cell membrane 300 whose two sides are in contact with completely different environments, the fuel chamber 7 side surface layer of relatively high wetness (high water content) has high proton conductivity and allows for easy permeation of liquid fuel.

In contrast, the vicinity of the oxidant chamber 8 side surface layer of relatively low wetness (relatively low water content) is low in proton conductivity and also low in liquid fuel permeability. As a result, the liquid fuel non-permeability of the membrane as a whole is considered to be a combination of different properties of the vicinities of two surface layers. Therefore, in order to allow the cation-exchange membrane used as a membrane of direct-liquid fuel cell to have high liquid fuel non-permeability, it is necessary to increase the liquid fuel non-permeability at the oxidant chamber 8 side surface layer of dry state and suppress the flow of a liquid fuel which migrates in a large amount from the fuel chamber 7 side of a wet state.

When the wetness of the cation exchange membrane is reduced by, for example, increasing the crosslinking degree thereof, to increase the liquid fuel non-permeability at the oxidant chamber 8 side surface layer, the flow (permeation) of liquid fuel to this surface layer is more suppressed certainly. However, the wetness at the fuel chamber 7 side surface layer becomes insufficient and the surface layer becomes lower in proton conductivity as explained previously. As a result, the membrane as a whole is unable to secure a required level of proton conductivity. Thus, when the cation-exchange membrane is used as a membrane for direct-liquid fuel cell, it is difficult to achieve both of liquid fuel non-permeability and high proton conductivity with a single membrane.

Figure 1:
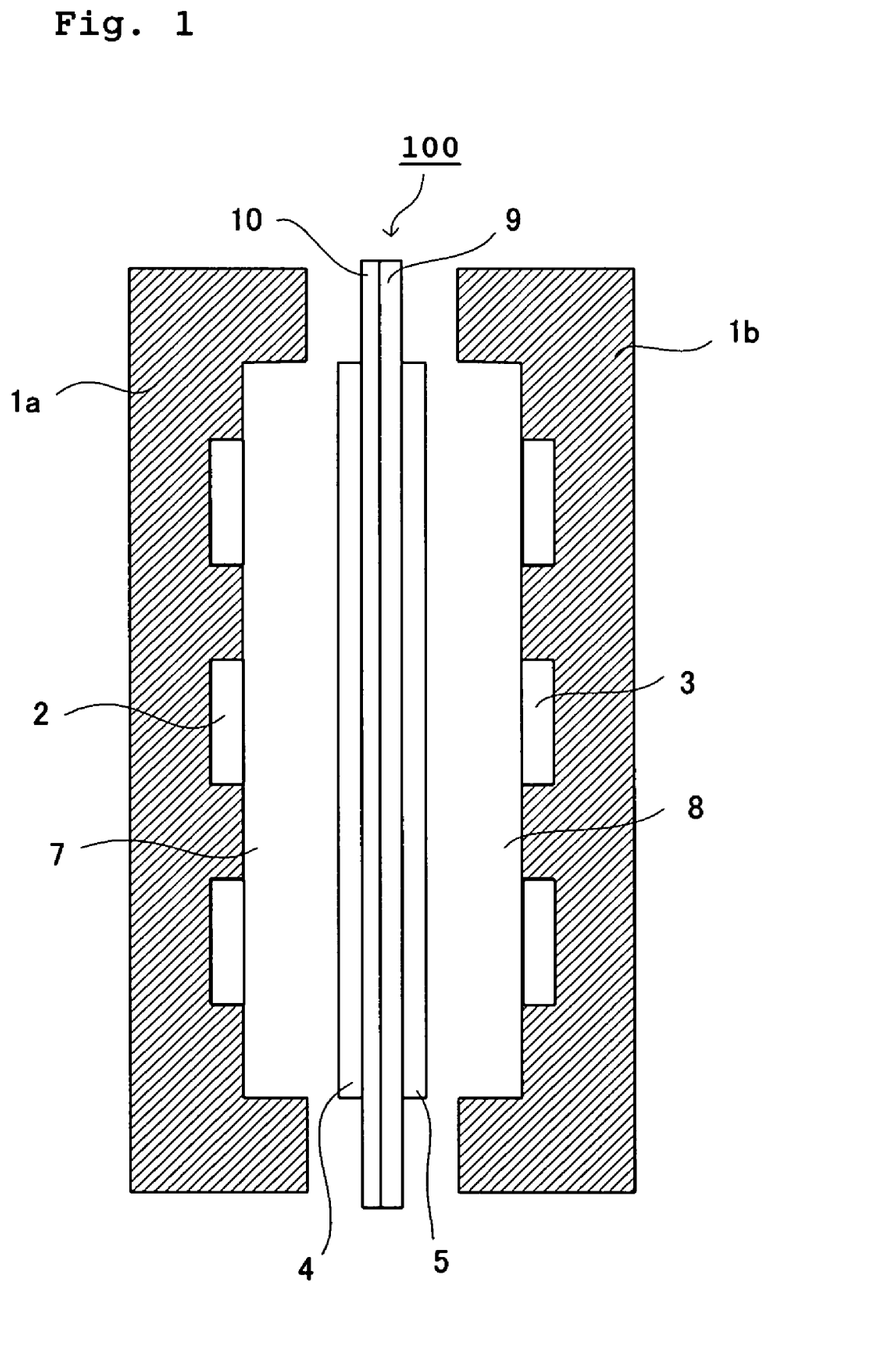
FIG. 1 is a conceptual drawing showing an example of the fundamental structure of a direct-liquid fuel cell having the membrane for fuel cell, of the present invention.

In contrast, in the present invention, the cation-exchange membrane is not a single membrane and has a layered structure as shown in FIG. 1. Further, a cation-exchange membrane layer 9 of low water content type is disposed in the oxidant chamber 8 side and a cation-exchange membrane layer 10 of high water content type is disposed in the fuel chamber 7 side. By this constitution, the suppression of liquid fuel permeation becomes high in the vicinity of the oxidant chamber 8 side surface layer of low wetness. Meanwhile, proton conductivity becomes high in the vicinity of the fuel chamber 7 side surface layer of high wetness. Therefore, the membrane as a whole can keep the proton conductivity at a sufficient level. It is presumed that, owing to the above mechanism, the present membrane has high suppression for liquid fuel permeation and high proton conductivity, which are ordinarily not satisfied simultaneously.

In the layered cation-exchange membrane used in the present invention, it is important that the cation-exchange membrane layer of low water content type A) has a water content of 1 to 15% by mass, preferably 4 to 9% by mass at a relative humidity of 50% RH (25° C.). This relative humidity of 50% RH specifies the average humidity of oxidant chamber 8. Therefore, the cation-exchange membrane layer of low water content type A), when it is used in a fuel cell of such type as the air surrounding the cell is taken in and per se supplied into the oxidant chamber and electricity is generated, has roughly such a low water content although there is a humidity change of some extent in the air. As a result, the cation-exchange membrane layer of low water content type can keep relatively superior non-permeability of liquid fuel.

When the water content at a relative humidity of 50% RH is more than 15% by mass, the suppression for liquid fuel permeation from fuel chamber side is insufficient and the layered cation-exchange membrane has high liquid fuel permeability as a whole. When the water content at a relative humidity of 50% RH is less than 1% by mass, the proton conductivity at the cation-exchange membrane layer of low water content type A) is low and the layered cation-exchange membrane has high electrical resistance as a whole.

Incidentally, the water content at a relative humidity of 100% RH, of the cation-exchange membrane layer having the above-mentioned low water content at a relative humidity of 50% RH is ordinarily 7 to 40% by mass, typically 7 to 30% by mass.

In the layered cation-exchange membrane used in the present invention, it is important that the cation-exchange membrane layer of high water content type B) has a water content at a relative humidity of 100% RH (25° C.), which is higher, by 3% by mass or more, preferably 4% by mass or more, than the water content of the cation-exchange membrane layer of low water content type A) at a relative humidity of 100% RH (25° C.). This relative humidity of 100% RH specifies the ordinary humidity of the fuel chamber 7. "Having the above-mentioned water content at this relative humidity" means that the cation-exchange membrane layer of high water content type B) has the above-mentioned water content when the membrane layer B) is used in a direct-liquid fuel cell and accordingly superior proton conductivity is obtained.

Incidentally, "a water content which is higher by 3% by mass or more" means a water content which is (P+3) % by mass or more when the water content of the cation-exchange membrane layer of low water content type is expressed as P (% by mass).

When the water content of the cation-exchange membrane layer of high water content type B) at a relative humidity of 100% RH is not higher than a value which is the water content of the cation-exchange member layer of low water content A) at a relative humidity of 100% RH (25° C.), plus an increment of 3%, the cation-exchange membrane layer of high water content type is low in proton conductivity and the layered cation-exchange membrane has, as a whole, a large electrical resistance.

The above increment of water content at a relative humidity of 100% RH (25° C.), of the cation-exchange membrane layer of high water content type B) is ordinarily 100% by mass or less, typically 30% by mass or less. When the increment of water content of the cation-exchange membrane layer of high water content type B) is more than 100% by mass, the layer is extremely low in crosslinking degree. This membrane layer of high wetness is insufficient in mechanical strength and inferior in shape retention, etc.

Incidentally, the water content of the cation-exchange membrane layer of high water content type B) at a relative humidity of 100% RH (25° C.) is ordinarily 10 to 135% by mass, typically 20 to 100% by mass. The water content of the cation-exchange membrane layer of high water content type B) at a relative humidity of 50% RH (25° C.) is ordinarily 7 to 50% by mass, typically 10 to 40% by mass.

The cation-exchange membrane layer of low water content type A) and the cation-exchange membrane layer of high water content type B) are each constituted as a single layer ordinarily. However, each layer may be constituted as a plurality of layers consisting of same or different two or more layers, as long as the above-specified water contents are satisfied.

In the layered cation-exchange membrane, the one side is formed by the cation-exchange membrane layer of low water content type A) and the other side is formed by the cation-exchange membrane layer of high water content type B). Ordinarily, these two cation-exchange membrane layers are laminated directly to constitute a layered cation-exchange membrane.

Figure 2:
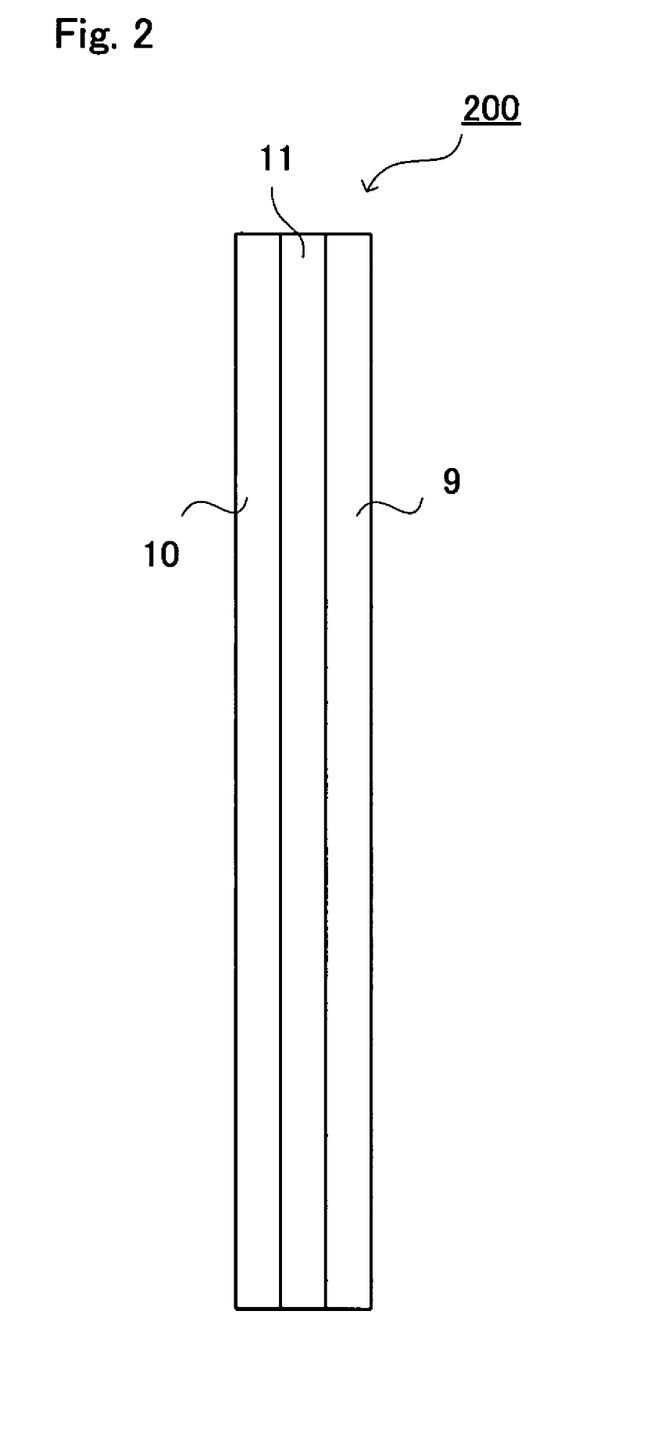
FIG. 2 is a conceptual drawing showing other example of the membrane for fuel cell, of the present invention.

As shown in FIG. 2, it is possible to interpose, between A) a cation-exchange membrane layer of low water content type 9 and B) a cation-exchange membrane layer of high water content type 10, an intermediate layer 11 composed of other cation-exchange membrane which does not satisfy the water content requirements for the above two layers, to constitute a layered cation-exchange membrane 200, as long as the low electrical resistance described later, required for the layered cation-exchange membrane can be secured. The intermediate layer 11 composed of a cation-exchange membrane is appropriately selected in consideration of the thickness, the kinds of the cation-exchange membrane layers A) and B), etc.

As the intermediate layer, there is ordinarily selected C) a cation-exchange membrane whose water content (C % by mass) at a relative humidity of 100% RH (25° C.) is larger than the water content (P % by mass) of the cation-exchange membrane layer of low water content type at a relative humidity of 100% RH (25° C.) and is smaller than [the water content (P % by mass)+3%], i.e. [P<C<(P+3)].

Incidentally, when the thickness of the intermediate layer 11 is extremely small, it is possible to employ an intermediate layer having a water content smaller than that of the cation-exchange membrane layer of low water content type A).

The layered cation-exchange membrane, which is a laminate of the cation-exchange membrane layer of low water content type A) and the cation-exchange membrane layer of high water content type B), needs to satisfy not only the above-mentioned water content requirements for the two layers but also the electrical resistance requirement of 0.5 to 0.01 Ω·cm² when measured in a 1 mol/L aqueous sulfuric acid solution at 25° C. Even when the water contents of the two cation-exchange membrane layers, particularly the water content of the cation-exchange membrane layer of low water content type A) is controlled at the above-mentioned level in negligence of proton conductivity, the resulting layered cation-exchange membrane is difficult to use as a membrane for fuel cell if the layered cation-exchange membrane does not satisfy the above-mentioned electrical resistance. Therefore, the water content of each cation-exchange membrane layer needs to be controlled so that the electrical resistance of the layered cation-exchange membrane can be maintained in the above range. The electrical resistance of the layered cation-exchange membrane, measured under the above conditions is particularly preferably 0.4 to 0.01 Ω·cm².

As the cation-exchange group introduced into the layered cation-exchange membrane, there can be mentioned sulfonic group, carboxyl group, phosphonic group, etc. Of these cation-exchange groups, preferred is strongly acidic sulfonic group from the standpoints of, for example, the small electrical resistance of the layered cation-exchange membrane obtained.

Each cation-exchange membrane layer constituting the layered cation-exchange membrane may be any kind as long as it can satisfy the above-mentioned water content requirement and, when made into a layered cation-exchange membrane, the above-mentioned electrical resistance requirement. A fluorine-containing cation-exchange membrane layer made of, for example, a non-crosslinked perfluorocarbonsulfonic acid membrane may be used if it satisfies the above requirements. Each cation-exchange membrane layer is preferably composed of a crosslinked, hydrocarbon-based cation-exchange membrane and is more preferably composed of a cation-exchange membrane obtained by filling a crosslinked, hydrocarbon-based cation-exchange resin in the pores of a porous membrane (a base material), because such a cation-exchange membrane can give a cation exchange layer of different water content (from a high water content to a low water content), can be produced easily, has a mechanical strength, and has various advantages mentioned above.

Here, the "hydrocarbon-based cation exchange resin" is a resin whose moiety other than cation-exchange group is composed mainly of carbon and hydrogen. This resin may contain small amounts of other atoms (e.g. fluorine, chlorine, bromine, oxygen, nitrogen, silicon, sulfur, born and phosphorus) at the moiety other than the cation-exchange group. The amount of other atoms is 40 mol % or less, preferably 10 mol % or less relative to the total number of the atoms constituting the moiety other than the cation-exchange group.

The crosslinked, hydrocarbon-based cation exchange resin is a resin containing, in a certain proportion, a crosslinked structure in which the hydrocarbon polymer chains constituting the resin are bonded by covalent bond. That is, it is a resin having covalent bond (e.g. carbon-carbon bond or carbon-oxygen bond)-based crosslinking sites in a certain extent. Generally, non-crosslinked resins and resins having an ionic bond-based crosslink alone tend to swell in a liquid fuel (e.g. methanol) and water and, in an extreme case, dissolve therein. Therefore, the hydrocarbon-based cation-exchange resin is preferred to have covalent bond-based crosslink at least in an extent that neither swelling nor dissolution takes place. Further, it is important and necessary to control the density of covalent bond-based crosslink in cation-exchange resin, as a means for allowing each cation exchange membrane layer to have a required water content. This point is made clear in the later-described production processes of layered cation-exchange membrane.

In general, the water content of the cation-exchange resin tends to be lower as the density of the covalent bond-based crosslink is higher, and tends to be higher as the density of the crosslink is lower.

In the present invention, the cation-exchange capacity of the layered cation-exchange membrane per se is ordinarily 0.1 to 4.0 mmol/g, and the cation-exchange capacity of each layer constituting the layered cation-exchange membrane is selected so that the cation-exchange capacity of the layered cation-exchange membrane per se falls in the above range. The water content of each layer is controlled as specified and the electrical resistance of the layered cation-exchange membrane is controlled at 0.5 to 0.01 Ω·cm² when measured in a 1 mol/L aqueous sulfuric acid solution at 25° C. In order to achieve it, the cation-exchange capacity of the cation-exchange membrane layer of low water content type A) is preferably 0.1 to 3.0 mmol/g, more preferably 0.1 to 2.6 mmol/g. Also, the cation-exchange capacity of the cation-exchange membrane layer of high water content type B) is preferably 0.3 to 4.0 mmol/g, more preferably 0.5 to 3.5 mmol/g. When an intermediate layer C) is used in the layered cation-exchange membrane, the cation-exchange capacity of the intermediate layer is preferably between the cation-exchange capacities of the above two layers.

With respect to the thickness of each cation-exchange membrane layer, the thickness of the cation-exchange membrane layer of low water content type A) is preferably 3 to 40 μm, more preferably 5 to 35 μm from the standpoints of, for example, easy satisfaction of the electrical resistance requirement for cation-exchange membrane. The thickness of the cation-exchange membrane layer of high water content type B) is preferably 5 to 150 μm, more preferably 10 to 120 μm. When an intermediate layer C) is used, the thickness is preferably 3 to 100 μm, more preferably 3 to 70 μm. The total thickness of the layered cation-exchange membrane is preferably 10 to 200 μm, more preferably 10 to 120 μm.

The layered cation-exchange membrane having the above-mentioned unique layered structure can be produced by any known process as long as the membrane produced satisfies the above-mentioned requirements.

Below is illustrated a preferred process for producing a layered cation-exchange membrane having, at each surface, a cation-exchange membrane layer in which a crosslinked, hydrocarbon-based cation-exchange resin is filled in the pores of a porous membrane.

In this process, first, there is prepared a polymerizable composition containing a polymerizable monomer having a functional group into which a cation-exchange group can be introduced or a cation-exchange group-containing polymerizable monomer, 0.5 to 40 mol %, preferably 1 to 30 mol %, relative to 100 mols of the polymerizable monomer, of a crosslinkable polymerizable monomer, and an effective amount of a polymerization initiator.

Then, the polymerizable composition is contacted with a layered porous membrane constituted by a low-porosity porous membrane having an average pore diameter of 0.005 to 10 µm, preferably 0.01 to 5 µm and a porosity of 10 to 50%, preferably 20 to 50% and a high-porosity porous membrane having an average pore diameter of 0.01 to 50 µm, preferably 0.02 to 40 µm and a porosity higher, by 7% or more, preferably 10 to 60%, than that of the low-porosity porous membrane, to fill the polymerizable composition in the pores of the layered porous membrane.

Then, the polymerizable composition filled in the pores is polymerized to obtain a membrane-shaped polymer. Thereafter, a cation-exchange group is introduced into the resin impregnated into the membrane-shaped polymer as necessary, to obtain a layered cation-exchange membrane.

According to this process, there can be obtained a layered cation-exchange membrane in which the following cation-exchange membrane layer of low water content type A) and the following cation-exchange membrane layer of high water content type B) are laminated.

Cation-Exchange Membrane Layer of Low Water Content Type A)

A layer formed by filling, in the pores of a low-porosity porous membrane having an average pore diameter of 0.005 to 10 µm, preferably 0.01 to 5 µm and a porosity of 10 to 50%, preferably 20 to 50%, a crosslinked, hydrocarbon-based cation-exchange resin having a cation-exchange capacity of 0.1 to 6.0 mmol/g, preferably 0.3 to 5.5 mmol/g, a water content of 2 to 150% by mass, preferably 8 to 90% by mass at a relative humidity of 50% RH (25° C.), and a water content of 14 to 250% by mass, preferably 20 to 150% by mass at a relative humidity of 100% RH (25° C.).

Cation-Exchange Membrane Layer of High Water Content Type B)

A layer formed by filling, in the pores of a high-porosity porous membrane having an average pore diameter of 0.01 to 50 µm, preferably 0.02 to 40 µm and a porosity higher, by 7% or more, preferably 10 to 60%, than that of the low-porosity porous membrane, the same crosslinked, hydrocarbon-based cation-exchange resin as filled in the pores of the low-porosity porous membrane of the membrane layer A).

Incidentally, in the present invention, the average pore diameter of the porous membrane is a value obtained by the measurement by the half-dry method based on ASTM F 316-86. Also, the porosity of the porous membrane is a value obtained by measurement of volume (V cm$^3$) and mass (U g) of porous membrane and subsequent calculation using the following formula (In the following formula, X (g/cm$^3$) is the density of material of porous membrane).

$$\text{Porosity} = [(V - U/X)/V] \times 100(\%)$$

In this production process, there is used, as a porous membrane which is a base material, a layered porous membrane which is a laminate of a low-porosity porous membrane and a high-porosity porous membrane; and one same polymerizable composition is filled in the pores of each porous membrane and is polymerized and cured. As a result, the cured resin constituting the interface of the two cation-exchange membrane layers obtained becomes homogeneous and the two cation-exchange membrane layers have good integrity.

Meanwhile, the cation-exchange membrane layer of low water content type A) and the cation-exchange membrane layer of high water content type B) need to be formed using the same cation-exchange resin. Therefore, the water contents of these two layers need to be controlled only by the difference in porosity between the two porous membranes (base materials). Hence, when there is formed a cation-exchange membrane layer of low water content type A) having a very-low water content, there is considered a case that the porosity of porous membrane is too small, resulting in insufficiency in proton conductivity. Therefore, the lower limit of the water content of the cation-exchange membrane layer of low water content type A) produced by the present process is ordinarily about 4% by mass in an atmosphere of 50% RH.

In the layered porous membrane used in the present process, the low-porosity porous membrane portion having an average pore diameter of 0.005 to 10 µm and a porosity of 10 to 50% constitutes the base material of the cation-exchange membrane layer of low water content type A) of the layered cation exchange membrane obtained. When the average pore diameter is smaller than the above range, the amount of the cation-exchange resin filled in the porous membrane is insufficient and it is difficult to obtain a uniform cation-exchange membrane layer. Meanwhile, when the average pore diameter is larger than the above range, it is impossible to obtain a high liquid fuel non-permeability. Also, when the porosity is smaller than the above range, the proton conductivity of the cation-exchange membrane layer is small and it is difficult to control the electrical resistance of the layered cation-exchange membrane obtained, in the range specified by the present invention. Meanwhile, when the porosity is larger than the above range, it is difficult to control the water content of the cation-exchange membrane layer in the range of small value specified by the present invention.

Also, in the layered porous membrane, the high-porosity porous membrane portion having an average pore diameter of 0.01 to 50 µm and a porosity higher, by 7% ore more, than that of the low-porosity porous membrane constitutes the base material of the cation-exchange membrane layer of high water content type B) of the layered cation exchange membrane obtained. When the average pore diameter is smaller than the above value, the amount of the cation-exchange resin filled in the porous membrane is insufficient and it is difficult to control the water content in the large-value range specified by the present invention. Meanwhile, when the average pore diameter is larger than the above value, it is unable to obtain a cation-exchange membrane layer of uniformity.

When the porosity is smaller than the above value, it is difficult to control the water content of the cation-exchange membrane layer in the large-value range specified by the present invention. Meanwhile, when the porosity is larger than the above value, the mechanical strength of the cation-exchange membrane layer is insufficient.

The layered porous membrane is not particularly restricted and can be used any membrane as long as the average pore diameter and porosity required for each porous membrane layer are satisfied.

The air permeability (JIS P 8117) of the layered porous membrane per se is preferably 1,500 seconds or less, particularly preferably 1,000 seconds or less. The surface smoothness of the membrane at each side surface is preferably 10 μm or less, more preferably 5 μm or less in terms of roughness index in order to achieve high liquid fuel non-permeability.

The layered porous membrane, which is a laminate of two porous membranes of different porosities, may be a mere laminate of the above mentioned low-porosity porous membrane and high-porosity porous membrane. Or, it may be a layered porous membrane obtained by applying an adhesive between the two layers. A layered cation-exchange membrane using a layered porous membrane obtained by thoroughly laminating the two layers with an adhesive, can maintain proton conductivity and liquid fuel non-permeability stably over a long period. Therefore, the layered porous membrane is preferably one obtained by laminating the two layers with an adhesive.

As to the method for adhesion, there is no particular restriction, and adhesion methods known in adhesion of polymer film can be used. Specifically, there can be mentioned, for example, a method of conducting adhesion with an adhesive so that the properties (e.g. average pore diameters and porosities) of the two porous membranes, specified by the present invention are not impaired; a method of fusion-bonding using a heat, a vibration, a high frequency, etc.; and a method of press-bonding mechanically at a pressure of 0.1 to 50 MPa. The adhesion by hot-pressing is preferred because it has an advantage of producing easily of a layered porous membrane and hardly impairs the above-mentioned properties of two porous membranes.

The hot-pressing is carried out using an apparatus capable of applying a pressure and a heat. In general, the hot-pressing is conducted using a hot press, a roll press or the like. The temperature used in the hot-pressing is generally 60° C. to 200° C. and the pressure used therein is ordinarily 0.1 to 50 MPa. The conditions of pressurization and heating depend upon the material and properties of the porous membrane used; therefore, the conditions of pressurization, heating, etc. are determined appropriately so that the properties of the porous membrane after hot-pressing do not deviate from the ranges specified by the present invention.

In the present production process, since the two porous membranes are integrated with a cation exchange resin filled therein, as described later, the adhesivity of the two porous membranes becomes relatively higher. Therefore, it is not necessary to conduct the hot-pressing of the two porous membranes at a temperature equal to or higher than the melting point of the material constituting the porous membranes.

As to the form of the porous membrane, there is no particular restriction. There can be used porous film, woven fabric, non-woven fabric, paper, inorganic membrane, etc. with no restriction. As the material for the porous membrane, there can be mentioned a thermoplastic resin, a thermosetting resin, an inorganic material, a mixture thereof, etc. A thermosetting resin is preferred for its easy production and the high adhesion strength obtained in adhesion with cation-exchange resin.

As the thermosetting resin, there can be mentioned, for example, polyolefin resins such as homopolymer or copolymer of α-olefin (e.g. ethylene, propylene, 1-butene, 1-pentene, 1-hexene, 3-methyl-1-butene, 4-methyl-1-pentene or 5-methyl-1-heptene and the like; vinyl chloride resins such as polyvinyl chloride, vinyl chloride-vinyl acetate copolymer, vinyl chloride-vinylidene chloride copolymer, vinyl chloride-olefin copolymer and the like; fluoroplastics such as polytetrafluoroethylene, polychlorotrifluoroethylene, polyvinylidene fluoride, tetrafluoroethylene-hexafluoropropylene copolymer, tetrafluoroethylene-perfluoroalkyl vinyl ether copolymer, tetrafluoroethylene-ethylene copolymer and the like; polyamide resins such as nylon 6, nylon 66 and the like; and polyimide resins. Of these, polyolefin resins are particularly preferred because they are superior in mechanical strength, chemical stability and chemical resistance and have high affinity with hydrocarbon-based ion-exchange resin. Of the polyolefin resins, polyethylene resin or polypropylene resin is particularly preferred and polyethylene resin is most preferred.

A polyolefin resin-made porous film is preferred because it is easy to procure the film having the above-mentioned average pore diameter and has a high strength, and a polyethylene resin-made porous film is particularly preferred.

(Polymerizable Composition)

The polymerizable composition filled in the pores of the layered porous membrane contains a polymerizable monomer having a functional group into which a cation-exchange group can be introduced or a cation-exchange group-containing polymerizable monomer, 0.5 to 40 mol %, relative to 100 mols of the polymerizable monomer, of a crosslinkable polymerizable monomer, and an effective amount of a polymerization initiator.

As to the polymerizable monomer having a functional group into which a cation-exchange group can be introduced, there is no particular restriction and a known such monomer can be used. Sulfonic group is an example of cation-exchange group preferably used in the present invention. Therefore, preferred as the polymerizable monomer is a radical-polymerizable monomer having an aromatic hydrocarbon group into which a cation-exchange group (e.g. sulfonic group) can be introduced.

As the polymerizable monomer into which a cation-exchange group can be introduced, there can be mentioned styrene, vinyltoluene, vinylxylene, α-methylstyrene, acenaphthylene, vinylnaphthalene, α-halogenated styrene, α,β,β'-trihalogenated styrene, etc.

As the radical-polymerizable monomer having the above-mentioned aromatic hydrocarbon group, a monomer having a structure in which vinyl group is bonded to aromatic hydrocarbon group such as styrene, is preferred to a monomer having a structure in which (meth)acrylic group is bonded. The reasons are, for example, that the former monomer is more unlikely to undergo hydrolysis.

As the polymerizable monomer having a cation-exchange group, there can be mentioned, for example, acidic group-containing radical-polymerizable monomers such as styrenesulfonic acid, 2-(meth)acrylamide-2-methylpropanesulfonic acid, 3-sulfopropyl(meth)acrylic acid ester, vinylsulfonic acid, vinylphosphonic acid, acrylic acid, methacrylic acid, maleic anhydride, α-halogenated vinylsulfonic acid, α,β,β'-halogenated vinylsulfonic acid, maleic acid, itaconic acid, styrenesulfonyl acid, vinylphosphoric acid and the like, salts corresponding thereto, and the like.

As the crosslinkable polymerizable monomer, there can be used any known crosslinking agent which can be copolymerized with one of the above-mentioned polymerizable monomers to form a crosslinked polymer. There can be mentioned, for example, divinyl compounds such as divinylbenzene, divinylsulfone, butadiene, chloroprene, divinylbiphenyl, trivinylbenzene, divinylnaphthalene, diallylamine, divinylpyridine and the like.

In order to allow each cation-exchange membrane layer to have its water content specified by the present invention, it is important to control the use amount of the crosslinkable polymerizable monomer. When the use amount of the crosslinkable polymerizable monomer is less than 0.5 mol % relative to 100 mols of the polymerizable monomer having a functional group into which a cation-exchange group can be introduced or the cation-exchange group-containing polymerizable monomer, formation of the cation-exchange membrane layer of low water content type A) is difficult. Meanwhile, when the use amount is more than 40 mol %, formation of the cation-exchange membrane layer of high water content type B) is difficult.

As to the polymerization initiator compounded in the polymerizable monomer composition, there is no particular restriction as long as the above-mentioned polymerizable monomers can be polymerized. The polymerization initiator is preferably an organic peroxide. There can be mentioned, for example, octanoyl peroxide, lauroyl peroxide, tert-butyl peroxy-2-ethylhexanoate, benzoyl peroxide, tert-butyl peroxyisobutyrate. Tert-butyl peroxylaurate, tert-hexyl peroxybenzoate and di-tert-butyl peroxide.

The use amount of the polymerization initiator may be an amount necessary for the initiation of polymerization. Ordinarily, the use amount is preferably 0.1 to 20 parts by mass, more preferably 0.5 to 10 parts by mass relative to 100 parts by mass of the total of the polymerizable monomers used.

In the polymerizable composition is preferably compounded a polymerizable monomer having a tertiary amino group capable of forming an ion complex with the cation-exchange group introduced into the cation-exchange membrane. By compounding the polymerizable monomer having such a tertiary amino group, the resulting layered cation-exchange membrane can have even higher liquid fuel non-permeability. As for the kind and use amount of the polymerizable monomer having a tertiary amino group, a method described in WO 2006/028292 can be employed.

In order to control physical properties such as mechanical strength, polymerizability or the like, the polymerizable composition may as necessary contain other component, besides the above-mentioned components, as long as there can be maintained the water content requirements and the electrical resistance requirement for layered cation-exchange membrane, all specified by the present invention. As such other component, there can be mentioned polymerizable monomers such as acrylonitrile, acrolein, methyl vinyl ketone and the like, and plasticizers such as dibutyl phthalate, dioctyl phthalate, dimethyl isophthalate, dibutyl adipate, triethyl citrate, acetyl tributyl citrate, dibutyl sebacate and the like.

As to the method for contact of the polymerizable composition with the porous membrane, there is no particular restriction as long as the polymerizable composition can be infiltrated into the pores of the porous membrane. There can be mentioned, for example, a method of coating the polymerizable composition on the porous membrane, a method of spraying, and a method of immersing the porous membrane in the polymerizable composition. When the immersion method is employed, the immersion time differs depending upon the kind of porous membrane and the formulation of suspension, but it is generally 0.1 second to ten and odds minutes.

As to the polymerization method, there is no particular restriction, either, and there can be appropriately employed a known method depending upon the polymerizable monomers and polymerization initiator used. When the above-mentioned organic peroxide is used as the polymerization initiator, a method by heating (thermal polymerization) is used generally. This method is preferred to other methods because the operation is easy and relatively homogeneous polymerization is possible. The polymerization is preferably conducted after the porous membrane filled with the polymerizable composition has been covered with a film made of a polyester or the like, in order to prevent the polymerization inhibition by oxygen and allow the obtained, membrane-shaped polymer to have a smooth surface. Covering the polymerizable composition-filled porous membrane with a film can moreover remove the excessive portion of the polymerizable composition from the porous membrane, making it possible to produce a fuel cell membrane which is thin and uniform.

The polymerization temperature employed in the thermal polymerization is not restricted particularly, and a known condition may be used appropriately. The polymerization temperature is generally about 50 to 150° C., preferably 60 to 120° C. The polymerization time is preferably 10 minutes to 10 hours.

The membrane-shaped polymer obtained by the above polymerization, using a cation-exchange group-containing monomer as a polymerizable monomer can be used as a membrane as is for direct-liquid fuel cell (a layered cation-exchange membrane), of the present invention.

Meanwhile, the membrane-shaped polymer obtained by the above polymerization, using, as a polymerizable monomer, a polymerizable monomer having a functional group into which a cation-exchange group can be introduced, is further subjected to a treatment of introducing a cation-exchange group into the functional group into which a cation-exchange group can be introduced. By this treatment, there can be obtained a membrane for direct-liquid fuel cell (a layered cation-exchange membrane), of the present invention.

For the treatment, there is appropriately employed a known method depending upon the functional group of the used polymerizable monomer having a functional group into which a cation-exchange group can be introduced. As described previously, sulfonic group is preferred as the cation-exchange group for fuel cell. When the sulfonic group is introduced, the polymerizable monomer having a functional group into which the cation-exchange group can be introduced, is preferably a polymerizable monomer having an aromatic hydrocarbon group. As the specific method for introducing sulfonic group into the aromatic hydrocarbon group, there can be mentioned, for example, a method of reacting the membrane-shaped polymer with a sulfonating agent such as concentrated sulfuric acid, fuming sulfonic acid, sulfur dioxide, chlorosulfonic acid or the like. By the above method, a layered cation-exchange membrane can be produced.

Next, other process for producing a layered cation-exchange membrane is described.

This process comprises producing beforehand the portion of a cation-exchange membrane layer of low water content type A) and the portion of a cation-exchange membrane layer of high water content type B) separately as a membrane a) and a membrane b) and then laminating the membrane a) and the membrane b) to obtain a layered cation-exchange membrane.

This process is preferably the following process because it is easy to operate and enable to allow for relatively uniform lamination.

It is a process which comprises producing the following two cation-exchange membranes separately beforehand:

a) a cation-exchange membrane of low water content type having a water content of 1 to 10% by mass at a relative humidity of 50% RH (25° C.) and an electrical resistance of 0.3 to 0.006 $\Omega \cdot cm^2$ in a 1 mol/L aqueous sulfuric acid solution at 25° C., and b) a cation-exchange membrane of high water content type having a water content at a relative humidity of 100% RH (25° C.) which is higher, by 3% by mass or more, than that of the cation-exchange membrane of low water content type at a relative humidity of 100% (25° C.) and an electrical resistance of 0.2 to 0.004 Ω·cm² in a 1 mol/L aqueous sulfuric acid solution at 25° C., and then hot-pressing these cation-exchange membranes.

In this production process, the portion of the cation-exchange membrane layer of low water content type A) and the portion of the cation-exchange membrane layer of high water content type B) can be produced beforehand separately as the membrane a) and the membrane b); therefore, the cation-exchange resin constituting each membrane can be selected freely. Accordingly, when this process is employed, the water content of each layer can be controlled not only by the porosity of the base material (porous membrane) of the layer but also by the crosslinking degree of the cation-exchange resin. As a result, as the cation-exchange membrane layer of low water content type A), there can be easily produced even a cation-exchange membrane having a water content of less than 4% at a relative humidity of 50% RH.

Meanwhile, in this production process for layered cation-exchange membrane, the membrane a) and the membrane b) produced separately need be hot-pressed uniformly. With no uniform hot-pressing, there is a risk that the electrical resistance of the layered cation-exchange membrane obtained is high and, moreover, in use thereof, the membranes a) and b) cause peeling at their interface.

The water content of the cation-exchange membrane of low water content type a) employed in the present production process must satisfy the water content requirement for the cation-exchange membrane layer of low water content type A). Further, the electrical resistance of the membrane a) measured in a 1 mol/L aqueous sulfuric acid solution at 25° C. needs to be 0.3 to 0.006 Ω·cm², preferably 0.25 to 0.012 Ω·cm². When the electrical resistance of the membrane a) is in this range, the resulting layered cation-exchange membrane can satisfy the electrical resistance requirement for layered cation-exchange membrane Similarly, the water content of the cation-exchange membrane of high water content type b) must satisfy the water content requirement for the cation-exchange membrane layer of high water content type B). Further, the electrical resistance of the membrane b) measured in a 1 mol/L aqueous sulfuric acid solution at 25° C. needs to be 0.2 to 0.004 Ω·cm², preferably 0.15 to 0.008 Ω·cm², for the same reason as above.

As each of the cation-exchange membranes a) and b), there is preferably used a cation-exchange membrane in which a crosslinked cation-exchange resin is filled in the pores of a porous membrane. The cation-exchange membrane of low water content type a) or the cation-exchange membrane of high water content type b), each having the above structure may be produced based on the firstly described process for production of layered cation-exchange membrane. That is, in the process, a single porous membrane is used as the porous membrane, in place of the layered porous membrane and other conditions are changed as necessary.

As the method for hot-pressing the cation-exchange membrane of low water content type a) and the cation-exchange membrane of high water content type b), there is a method of laminating the two membranes and hot-pressing them mechanically at a temperature of 80 to 300° C. at a pressure of 0.1 to 50 MPa. The hot-pressing is conducted generally using a hot press or a hot roll. For strong hot-pressing, it is preferred to make rough beforehand either surface or both surfaces of the cation-exchange membrane of low water content type a) and the cation-exchange membrane of high water content type b) by means of sandblasting or the like.

The surface of each cation-exchange membrane in which a crosslinked cation-exchange resin is filled in the pores of a porous membrane, is ordinarily covered with the crosslinked cation-exchange resin. In hot-pressing the membranes a) and b), it is preferred that the crosslinked cation-exchange resin covering the surface is removed at least at part of the interface of the membranes a) and b) to expose the porous membrane made of a thermoplastic resin and then hot-pressing is conducted. This operation can give an increased adhesion strength at the interface.

As the method for removal of the cation-exchange resin covering the surface, there can be mentioned, for example, a method (described in JP 2001-157823 A) of subjecting the surface layer of cation-exchange membrane to oxidative decomposition using an oxidant, and a method of adding a non-polymerizable component to the polymerizable composition used in production of cation-exchange membrane and, in the step for production of cation-exchange membrane, obtaining a cation-exchange membrane having no surface layer.

Further, it is particularly preferred to use a thermoplastic resin as the raw material of the porous membrane constituting the membranes a) and b) and conducting hot-pressing at a high temperature which is at least the melting point of the thermoplastic resin, preferably 0 to 50° C. higher than the melting point. In this case, the thermoplastic resin-made porous membranes of the laminated membranes a) and b) are bonded strongly by fusion-bonding. The melting point of the thermoplastic resin constituting the thermoplastic resin-made porous membrane is preferably 80 to 300° C., more preferably 100 to 250° C.

The layered cation-exchange membrane may be produced by any process other than the above-described processes as long as the cation-exchange membrane layer of low water content type A) and the cation-exchange membrane layer of high water content type B) satisfy the above-mentioned physical property ranges. The layered cation-exchange membrane may be produced, for example, by a process of producing a layer A) as a single cation-exchange membrane and laminating thereon a layer B) by casting.

The fuel cell provided with the membrane for fuel cell, of the present invention is a direct-liquid fuel cell. Direct-liquid fuel cell generally has a fundamental structure shown in FIG. 1. The membrane of the present invention can also be used in a direct-liquid fuel cell having other known structure.

In incorporating the membrane of the present invention into a direct-liquid fuel cell, the incorporation is conducted so that the cation-exchange membrane layer of low water content type a) is at the oxidant chamber side and the cation-exchange membrane layer of high water content type b) is at the fuel chamber side. By conducting the incorporation in such a direction, the membrane of the present invention exhibits excellent suppression for liquid fuel permeation. Even when the incorporation is made in the opposite direction, that is, the cation-exchange membrane layer of low water content type A) is at the fuel chamber side and the cation-exchange membrane layer of high water content type B) is at the oxidant chamber side, good liquid fuel non-permeability is obtained, as compared with the same type membrane for fuel cell, composed of conventional single cation-exchange membrane. However, the effect is far small as compared with the above case of integration in correct direction.

As the liquid fuel of a direct-liquid fuel cell using the membrane of the present invention, methanol is most typical and exhibits the effect of the present invention most strikingly. However, similar excellent effects are exhibited also when using other liquid fuels such as ethanol, ethylene glycol, dimethyl ether, hydrazine and the like. These liquid fuels are ordinarily fed into a fuel cell in the form of a 1 to 99% by mass aqueous solution.

EXAMPLES

The present invention is described in more detail below by way of Examples. However, the present invention is in no way restricted by these Examples.

Incidentally, in the following Examples and Comparative Examples, each membrane (cation-exchange membrane) was measured for cation-exchange capacity, water content, membrane resistance, methanol permeability and output voltage when incorporated into a fuel cell, to evaluate the properties. The measurement method for each property is described below.

1) Measurement of Cation-Exchange Capacity and Water Content, of Cation-Exchange Membrane A cation-exchange membrane was immersed in a 1 mol/L aqueous HCl solution for 10 hours or more to switch it into a hydrogen ion type. The cation-exchange membrane of hydrogen ion type was converted into a sodium ion type with a 1 mol/L aqueous NaCl solution. The hydrogen ion liberated was quantitatively determined with an aqueous sodium hydroxide solution, using a potentiometric titration apparatus (COMTITE-900, produced by Hiranuma Sangyo K.K.) (A mol).

Then, the same cation-exchange membrane was immersed in a 1 mol/L aqueous HCl solution at 25° C. for 4 hours or more, and then was taken out and washed with deionized water thoroughly. Then, the water on the membrane was wiped off with a tissue paper and the wet weight ($W_{100}$ g) of the membrane was measured. The weight was taken as the hydrous mass of the membrane at a relative humidity of 100% RH (25° C.). After the measurement of $W_{100}$, the membrane was placed in a thermo-hygrostat set at 25° C. and 50% RH and allowed to stand overnight. Then, the weight ($W_{50}$ g) of the membrane at 50% RH (25° C.) was measured. The membrane was vacuum-dried at 60° C. for 5 hours and its mass (D g) was measured. Using the above-measurement data, the cation-exchange capacity and water contents of the cation-exchange membrane were determined using the following expressions.

Cation-exchange capacity=$A\times 1000/D$(mmol/g–dry mass)

Water content at relative humidity of 100% $RH(25°$ C.$)=100\times(W_{100}-D)/D$(%)

Water content at relative humidity of 50% $RH(25°$ C.$)=100\times(W_{50}-D)/D$(%)

2) Cation-Exchange Capacity and Water Content, of Cation-Exchange Resin Filled in the Pores of Porous Membrane A base material was measured for wet mass ($G_w$ g) when immersed in deionized water at 25° C. for 4 hours or more and mass ($G_d$ g) when vacuum-dried at 60° C. for 5 hours. A cation-exchange membrane was produced using the same base material, and was measured, in the same manners as mentioned above, for dry mass (D g), cation-exchange capacity, and water contents at relative humidities of 100% RH (25° C.) and 50% RH (25° C.). Using these data, the cation-exchange capacity and water contents of the filled cation-exchange resin were determined using the following expressions.

Cation-exchange capacity=$A\times 1000/(D-D_d)$(mmol/g–dry mass)

Water content at relative humidity of 100% $RH(25°$ C.$)=100\times[(W_{100}-G_w)-(D-G_d)]/(D-G_d)$(%)

Water content at relative humidity of 50% $RH(25°$ C.$)=100\times[(W_{50}-G_w)-(D-G_d)]/(D-G_d)$(%)

3) Average Pore Diameter of Porous Membrane

Measured by the half-dry method, based on ASTM F 316-86.

4) Porosity of Porous Membrane

A porous membrane was measured for volume (V cm³) and mass (U g). Using the data, the porosity of the porous membrane was calculated using the following expression, by taking the density of the polyethylene (which was a base material of the porous membrane) at 0.9 g/cm³.

Porosity=$[(V-U/0.9)/V]\times 100$(%)

5) Electrical Resistance of Membrane

An ion-exchange membrane was sandwiched in a two-chambered cell each provided with platinum black electrodes. At both sides of the ion-exchange membrane was filled a 1 mol/l aqueous sulfuric acid solution. A resistance between the electrodes at 25° C. was measured using an AC bridge circuit (frequency: 1,000 cycles/sec). From the difference between the above resistance between electrodes and the resistance between electrodes when no ion-exchange membrane was placed, there was determined the electrical resistance of the membrane. In the above measurement, the membrane used was a membrane which had been equilibrated in a 1 mol/L aqueous sulfuric acid solution.

4) Methanol Permeability

A cation-exchange membrane was immersed in a 1 mol/L aqueous HCl solution for 10 hours or more, to switch it to a hydrogen ion type. Then, the membrane was dried at room temperature for 24 hours or more. This cation-exchange membrane was fitted to a fuel cell (membrane area: 1 cm²) at the center. Into one chamber was fed an aqueous solution containing 30% by mass of methanol, using a pump for liquid chromatography; into other chamber of opposite side was fed argon gas at a rate of 300 ml/min. The measurement was conducted in a thermostat of 25° C. A given amount of the argon gas flowing out from the opposite side chamber was collected using a gas sampler, was introduced directly into a gas chromatograph (GC 14B produced by Shimadzu Corporation), and was measured for methanol concentration in argon gas. Using the data, the amount of methanol permeated through the membrane was calculated.

6) Output Voltage of Fuel Cell

A catalyst was coated in an amount of 4 mg/cm² on a carbon paper of 100 μm in thickness and 80% in porosity, which had been subjected to a water repellency treatment with a polytetrafluoroethylene. The coated carbon paper was vacuum-dried at 80° C. for 4 hours to obtain a gas diffusion electrode.

The catalyst at the fuel chamber side was a carbon black loaded with 50% by mass of a platinum-ruthenium alloy catalyst (ruthenium: 50 mol %), and the catalyst at the oxidant chamber side was a carbon black loaded with 50% by mass of platinum. Each catalyst-loaded carbon black was mixed with a solution [Nafion™ produced by Du Pont] obtained by dissolving 5% of perfluorocarbonsulfonic acid in alcohol and water, and the mixture was coated on the above-mentioned carbon paper.

Then, the above gas diffusion electrode of oxidant chamber side was placed on the surface of the cation-exchange membrane layer of low water content type of a fuel cell membrane which had been switched to a hydrogen ion type; the gas diffusion electrode of fuel chamber side was placed on the surface of the cation-exchange membrane layer of high water content type of the fuel cell membrane; the resulting assembly was hot-pressed for 100 seconds at 100° C. at a pressure of 5 MPa and then was allowed to stand at room temperature for 2 minutes. The resulting membrane was incorporated into a fuel cell having a structure shown in FIG. 1. The fuel cell temperature was set at 25° C.; a 30% by mass aqueous methanol solution was fed into the fuel chamber side, and an air of atmospheric pressure having a relative humidity of 80% was fed into the oxidant chamber side at a rate of 200 ml/min; and an electricity generation test was conducted. A terminal voltage of cell was measured at current densities of 0 A/cm$^2$ and 0.1 A/cm$^2$.

Production Example 1

To 100 parts by mass of a monomer mixture consisting of 70 mol % of styrene and 30 mol % of divinylbenzene was added 5 parts by mass of a polymerization initiator, i.e. tert-butyl peroxyethylhexanoate. In this polymerizable composition was immersed a porous film (made of a polyethylene having a weight-average molecular weight of 250,000, thickness: 25 μm, average pore diameter: 0.03 μm, porosity: 37%) for 5 minutes.

Then, the porous film was taken out from the polymerizable composition and covered, at the both surfaces, with a 100-μm polyester film (peeling material). Then, thermal polymerization was conducted at a nitrogen pressure of 0.3 MPa at 80° C. for 5 hours.

The membrane-shaped polymer obtained was immersed, at 40° C. for 60 minutes, in a 1:1 mixture of 98% concentrated sulfuric acid and chlorosulfonic acid of 90% or more in purity, to subject the styrene-derived benzene ring to sulfonation, whereby a cation-exchange membrane was obtained.

The cation-exchange membrane was measured for cation-exchange capacity, water content at each humidity, electrical resistance and thickness. The results are shown in Table 2.

Production Examples 2 to 5

Cation-exchange membranes were obtained in the same manner as in Production Example 1 except that polymerizable compositions and porous films, all shown in Table 1 were used. Each cation-exchange membrane obtained was measured for 5' cation-exchange capacity, water content at each humidity, electrical resistance and thickness. The results are shown in Table 2.

TABLE 1

| Production Example | Porous film[1] | Mixing proportions of polymerizable monomers (mol %) | | | | Addition amounts of additives (parts by mass[9]) | | Addition amounts of polymerization initiator PO[8] (parts by mass[9]) |
|---|---|---|---|---|---|---|---|---|
| | | St[2] | M-St[3] | 4VP[4] | DVB[5] | DBE[6] | PPG[7] | |
| 1 | A | 70 | — | — | 30 | — | — | 5 |
| 2 | A | 51.1 | — | 41.4 | 7.4 | — | — | 5 |
| 3 | A | — | — | 79 | 21 | — | — | 5 |
| 4 | C | 95.4 | — | — | 4.6 | — | — | 5 |
| 5 | B | 95.4 | — | — | 4.6 | 30 | 50 | 5 |

[1]Porous film
A: made of a polyethylene having a weight-average molecular weight of 250,000, thickness: 9 μm, average pore diameter: 0.03 μm, porosity: 35%
B: made of a polyethylene having a weight-average molecular weight of 250,000, thickness: 25 μm, average pore diameter: 0.03 μm, porosity: 37%
C: made of a polyethylene having a weight-average molecular weight of 250,000, thickness: 25 μm, average pore diameter: 0.1 μm, porosity: 49%
[2]St: styrene
[3]M-St: 4-methylstyrene
[4]4VP: 4-vinylpyridine
[5]DVB: divinylbenzene
[6]DBE: dibenzyl ether
[7]PPG: polypropylene glycol (diol type, molecular weight: 3,000)
[8]PO: tert-butyl peroxyethylhexanoate
[9]mass relative to 100 parts by mass of total polymerizable monomers

TABLE 2

| Production Example | Cation-exchange capacity (mmol/g-dry mass) | Water content (mass %) (25° C.) | | Membrane resistance (Ω·cm$^2$) | Membrane thickness (μm) |
|---|---|---|---|---|---|
| | | 50% RH | 100% RH | | |
| 1 | 1.6 | 6 | 10 | 0.13 | 9 |
| 2 | 0.8 | 7 | 19 | 0.11 | 9 |
| 3 | 1.9 | 9 | 16 | 0.12 | 9 |
| 4 | 2.8 | 15 | 32 | 0.05 | 31 |
| 5 | 1.9 | 14 | 25 | 0.06 | 28 |

Example 1

The cation-exchange membrane of Production Example 1 and the cation-exchange membrane of Production Example 4 were separately immersed in a 1 mol/L aqueous HCl solution for 10 hours or more to switch them into a hydrogen ion type. They were dried at room temperature for 24 hours or more. Then, these cation-exchange membranes were laminated and hot-pressed at 130° C. at a pressure of 5 MPa to obtain a membrane for direct-liquid fuel cell, of the present invention, composed of a layered cation-exchange membrane.

The layered cation-exchange membrane obtained was measured for ion-exchange capacity, water contents, electrical resistance, thickness, methanol permeability and output voltage when incorporated into a fuel cell. The results are shown in Table 3.

Examples 2 to 4

Layered cation-exchange membranes were obtained in the same manner as in Example 1 except that each combination of cation-exchange membranes, shown in Table 3 was used. The layered cation-exchange membranes were measured for properties. The results are shown in Table 3.

Comparative Examples 1 to 5

Each of the cation-exchange membranes of Production Examples 1 to 5 was used as is as a membrane for fuel cell, and was measured for properties. The results are shown in Table 3.

Comparative Examples 6 and 7

Layered cation-exchange membranes were obtained in the same manner as in Example 1 except that each combination of cation-exchange membranes, shown in Table 3 was used. The layered cation-exchange membranes were measured for properties. The results are shown in Table 3.

Then, the layered porous film immersed was taken out from the polymerizable composition and covered, at the both surfaces, with a 100-μm polyester film (peeling material). Then, thermal polymerization was conducted at a nitrogen pressure of 0.3 MPa at 80° C. for 5 hours.

The membrane-shaped polymer obtained was immersed, at 40° C. for 60 minutes, in a 1:1 mixture of 98% concentrated sulfuric acid and chlorosulfonic acid of 90% or more in purity, to subject the styrene-derived benzene ring to sulfonation, whereby a layered cation-exchange membrane was obtained.

The layered cation-exchange membrane was measured for cation-exchange capacity, water content, electrical resistance, thickness, methanol permeability and output voltage of fuel cell.

Further, the layered cation-exchange membrane was placed in boiling water for 3 hours or more to give rise to sufficient swelling. Then, the swollen layered cation-exchange membrane was peeled at the interface of the low water content layer and the high water content layer and separated into two layers. The two layers were measured for water content at each humidity and membrane thickness. The results are shown in Tables 5 and 6.

Examples 6 and 7

Layered cation-exchange membranes of the present invention were obtained in the same manner as in Example 5 except

TABLE 3

| Example | Cation-exchange membrane layer of low water content type | Cation-exchange membrane layer of high water content type | Cation-exchange capacity (mmol/g-dry membrane) | Membrane resistance ($\Omega \cdot cm^2$) | Membrane thickness (μm) | Methanol permeability[1] [g/($m^2 \cdot hr$)] High → Low | Methanol permeability[1] [g/($m^2 \cdot hr$)] Low → High | Output voltage of fuel cell (V) 0 mA/$cm^2$ | Output voltage of fuel cell (V) 0.1 mA/$cm^2$ |
|---|---|---|---|---|---|---|---|---|---|
| 1 | Production Example 1 | Production Example 4 | 2.3 | 0.19 | 40 | 200 | 300 | 0.75 | 0.37 |
| 2 | Production Example 2 | Production Example 5 | 1.6 | 0.17 | 36 | 150 | 240 | 0.82 | 0.43 |
| 3 | Production Example 3 | Production Example 4 | 2.3 | 0.18 | 39 | 150 | 230 | 0.82 | 0.39 |
| 4 | Production Example 3 | Production Example 5 | 1.9 | 0.18 | 37 | 140 | 220 | 0.83 | 0.43 |
| Comparative Example 1 | Production Example 1 | — | 1.6 | 0.13 | 9 | 600 | 600 | 0.60 | 0.23 |
| Comparative Example 2 | Production Example 2 | — | 0.8 | 0.11 | 9 | 400 | 400 | 0.71 | 0.33 |
| Comparative Example 3 | Production Example 3 | — | 1.9 | 0.12 | 9 | 300 | 300 | 0.73 | 0.34 |
| Comparative Example 4 | Production Example 4 | — | 2.8 | 0.05 | 31 | 1050 | 1050 | 0.52 | 0.22 |
| Comparative Example 5 | Production Example 5 | — | 1.9 | 0.06 | 28 | 1000 | 1000 | 0.55 | 0.22 |
| Comparative Example 6 | Production Example 2 | Production Example 2 | 0.8 | 0.23 | 18 | 310 | 310 | 0.74 | 0.30 |
| Comparative Example 7 | Production Example 5 | Production Example 5 | 1.9 | 0.13 | 55 | 750 | 750 | 0.58 | 0.23 |

[1]High → low: a methanol permeability in a direction from cation-exchange membrane layer of high water content type to cation-exchange membrane layer of low water content type
Low → high: a methanol permeability in a direction from cation-exchange membrane layer of low water content type to cation-exchange membrane layer of high water content type Example 5

Two different porous films shown in Table 4 were hot-pressed at 110° C. at a pressure of 1 MPa for 3 minutes to produce a layered porous film.

This layered porous film was immersed, for 5 minutes, in a polymerizable composition consisting of 70 mole % of styrene, 30 mol % of divinylbenzene and 5 parts by mass, per 100 parts by mass of total monomers, of a polymerization inhibitor, i.e. tert-butyl peroxyethylhexanoate.

that polymerizable compositions and porous films, shown in Table 4 were used. The properties thereof are shown in Tables 5 and 6.

Comparative Examples 8 and 9

Layered cation-exchange membranes of the present invention were obtained in the same manner as in Example 5 except that polymerizable compositions and porous films, shown in Table 4 were used. The properties thereof are shown in Tables 5 and 6.

TABLE 4

| Example | Porous film[1] Cation-exchange membrane layer of low water content type | Porous film[1] Cation-exchange membrane layer of high water content type | Mixing proportions of polymerizable monomers (mol %) St[2] | Mixing proportions of polymerizable monomers (mol %) M-St[3] | Mixing proportions of polymerizable monomers (mol %) 4VP[4] | Mixing proportions of polymerizable monomers (mol %) DVB[5] | Addition amount of polymerization initiator PO[6] (mass parts[7]) |
|---|---|---|---|---|---|---|---|
| 5 | A | C | 51.3 | — | 45.6 | 3.1 | 5 |
| 6 | A | C | — | 79 | — | 21 | 5 |
| 7 | A | D | — | 79 | — | 21 | 5 |
| Comparative Example 8 | A | A | — | 79 | — | 21 | 5 |
| Comparative Example 9 | C | C | — | 79 | — | 21 | 5 |

[1]Porous film
A: made of a polyethylene having a weight-average molecular weight of 250,000, thickness: 9 μm, average pore diameter: 0.03 μm, porosity: 35%
C: made of a polyethylene having a weight-average molecular weight of 250,000, thickness: 25 μm, average pore diameter: 0.1 μm, porosity: 49%
D: made of a polyethylene having a weight-average molecular weight of 250,000, thickness: 55 μm, average pore diameter: 0.2 μm, porosity: 62%
[2]St: styrene
[3]M-St: 4-methylstyrene
[4]4VP: 4-vinylpyridine
[5]DVB: divinylbenzene
[6]PO: tert-butyl peroxyethylhexanoate
[7]mass relative to 100 parts by mass of total polymerizable monomers

TABLE 5

| | Cation-exchange membrane layer of low water content type | | | | | Cation-exchange membrane layer of high water content type | | | | |
|---|---|---|---|---|---|---|---|---|---|---|
| | Thickness (μm) | Filled cation-exchange resin Water content (mass %) (25° C.) 50% RH | Filled cation-exchange resin Water content (mass %) (25° C.) 100% RH | Filled cation-exchange resin Cation-exchange capacity (mmol/g-dry membrane) | Water content (mass %) (25° C.) 50% RH | Water content (mass %) (25° C.) 100% RH | Thickness (μm) | Filled cation-exchange resin Water content (mass %) (25° C.) 50% RH | Filled cation-exchange resin Water content (mass %) (25° C.) 100% RH | Filled cation-exchange resin Cation-exchange capacity (mmol/g-dry membrane) | Water content (mass %) (25° C.) 50% RH | Water content (mass %) (25° C.) 100% RH |

| Example | Thickness (μm) | 50% RH | 100% RH | Cap. | 50% RH | 100% RH | Thickness (μm) | 50% RH | 100% RH | Cap. | 50% RH | 100% RH |
|---|---|---|---|---|---|---|---|---|---|---|---|---|
| 5 | 9 | 10 | 27 | 1.9 | 29 | 77 | 25 | 14 | 38 | 1.9 | 29 | 77 |
| 6 | 9 | 9 | 16 | 5.4 | 26 | 46 | 26 | 13 | 23 | 5.4 | 26 | 46 |
| 7 | 9 | 9 | 16 | 5.4 | 26 | 46 | 56 | 16 | 29 | 5.4 | 26 | 46 |
| Comparative Example 8 | 9 | 9 | 16 | 5.4 | 26 | 46 | 9 | 9 | 16 | 5.4 | 26 | 46 |
| Comparative Example 9 | 26 | 13 | 23 | 5.4 | 27 | 47 | 26 | 13 | 23 | 5.4 | 27 | 47 |

TABLE 6

| Example | Cation-exchange capacity (mmol/g-dry membrane) | Membrane resistance (Ω·cm²) | Membrane thickness (μm) | Methanol permeability[1] [g/m²·hr] High → low | Methanol permeability[1] [g/m²·hr] Low → high | Output voltage of fuel cell (V) 0 mA/cm² | Output voltage of fuel cell (V) 0.1 mA/cm² |
|---|---|---|---|---|---|---|---|
| 5 | 0.8 | 0.25 | 34 | 100 | 160 | 0.85 | 0.39 |
| 6 | 2.5 | 0.29 | 35 | 65 | 90 | 0.87 | 0.40 |
| 7 | 3.1 | 0.32 | 65 | 50 | 70 | 0.88 | 0.39 |
| Comparative Example 8 | 1.9 | 0.24 | 18 | 230 | 230 | 0.74 | 0.30 |
| Comparative Example 9 | 3.3 | 0.35 | 52 | 100 | 100 | 0.84 | 0.29 |

[1]High → low: a methanol permeability in a direction from cation-exchange membrane layer of high water content type to cation-exchange membrane layer of low water content type
Low → high: a methanol permeability in a direction from cation-exchange membrane layer of low water content type to cation-exchange membrane layer of high water content type

The invention claimed is:

1. A membrane for direct-liquid fuel cell, comprised of a layered cation-exchange membrane whose one side is constituted by A) a cation-exchange membrane layer of low water content type having a water content of 1 to 15% by mass at a relative humidity of 50% RH (25° C.) and whose other side is constituted by B) a cation-exchange membrane layer of high water content type having, at a relative humidity of 100% RH (25° C.), a water content which is higher, by 3% by mass or more, than the water content of the cation-exchange membrane layer of low water content type at a relative humidity of 100% RH (25° C.), the layered cation-exchange membrane having an electrical resistance of 0.5 to 0.01 Ω·cm² in a 1 mol/L aqueous sulfuric acid solution at 25° C.

2. The membrane for direct-liquid fuel cell according to claim 1, wherein
the cation-exchange membrane layer of low water content type A) is a layer formed by filling, in the pores of a low-porosity porous membrane having an average pore diameter of 0.005 to 10 μm and a porosity of 10 to 50%, a crosslinked, hydrocarbon-based cation-exchange resin having a cation exchange capacity of 0.1 to 6.0 mmol/g, a water content of 2 to 150% by mass at a relative humidity of 50% RH (25° C.) and a water content of 14 to 250% by mass at a relative humidity of 100% RH (25° C.), and
the cation-exchange membrane layer of high water content type B) is a layer formed by filling, in the pores of a high-porosity porous membrane having an average pore diameter of 0.01 to 50 μm and a porosity higher, by 7% or more, than that of the low-porosity porous membrane, the same crosslinked, hydrocarbon-based cation-exchange resin as filled in the pores of the low-porosity porous membrane of the membrane layer A).

3. A process for producing a membrane for direct-liquid fuel cell, the membrane being comprised of a layered cation-exchange membrane whose one side is constituted by A) a layer formed by filling, in the pores of a low-porosity porous membrane having an average pore diameter of 0.005 to 10 μm and a porosity of 10 to 50%, a crosslinked, hydrocarbon-based cation-exchange resin having a cation exchange capacity of 0.1 to 6.0 mmol/g, a water content of 2 to 150% by mass at a relative humidity of 50% RH (25° C.) and a water content of 14 to 250% by mass at a relative humidity of 100% RH (25° C.) and whose other side is constituted by B) a layer formed by filling, in the pores of a high-porosity porous membrane having an average pore diameter of 0.01 to 50 μm and a porosity higher, by 7% or more, than that of the low-porosity porous membrane, the same crosslinked, hydrocarbon-based cation-exchange resin as filled in the pores of the low-porosity porous membrane of the membrane layer A), and the layered cation-exchange membrane having an electrical resistance of 0.5 to 0.01 Ω·cm² in a 1 mol/L aqueous sulfuric acid solution at 25° C.,
the process being characterized by contacting a polymerizable composition containing a polymerizable monomer having a functional group into which cation-exchange group can be introduced or a cation-exchange group-containing polymerizable monomer, 0.5 to 40 mol %, relative to 100 mols of the polymerizable monomer, of a crosslinkable polymerizable monomer, and an effective amount of a polymerization initiator, with a layered porous membrane constituted by a low-porosity porous membrane having an average pore diameter of 0.005 to 10 μm and a porosity of 10 to 50% and a high-porosity porous membrane having an average pore diameter of 0.01 to 50 μm and a porosity higher, by 7% or more, than that of the low-porosity porous membrane, to fill the polymerizable composition in the pores of the layered porous membrane, then polymerizing and curing the composition, thereafter introducing a cation-exchange group as necessary.

4. A process for producing a membrane for direct-liquid fuel cell, the membrane being comprised of a layered cation-exchange membrane whose one side is constituted by A) a cation-exchange membrane layer of low water content type having a water content of 1 to 15% by mass at a relative humidity of 50% RH (25° C.) and whose other side is constituted by B) a cation-exchange membrane layer of high water content type having, at a relative humidity of 100% RH (25° C.), a water content which is higher, by 3% by mass or more, than the water content of the cation-exchange membrane layer of low water content type at a relative humidity of 100% RH (25° C.), the layered cation-exchange membrane having an electrical resistance of 0.5 to 0.01 Ω·cm² in a 1 mol/L aqueous sulfuric acid solution at 25° C.,
the process being characterized by hot-pressing
a) a cation-exchange membrane of low water content type having a water content of 1 to 15% by mass at a relative humidity of 50% RH (25° C.) and an electrical resistance of 0.3 to 0.006 Ω·cm² in a 1 mol/L aqueous sulfuric acid solution at 25° C., and
b) a cation-exchange membrane of high water content type having, at a relative humidity of 100% RH (25° C.), a water content higher by 3% by mass or more than that of the cation-exchange membrane of low water content type at a relative humidity of 100% RH (25° C.) and an electrical resistance of 0.2 to 0.004 Ω·cm² in a 1 mol/L aqueous sulfuric acid solution at 25° C.

5. A direct-liquid fuel cell in which a membrane for direct-liquid fuel cell according to claim 1 or 2 is incorporated.

6. The direct-liquid fuel cell according to claim 5, in which the membrane for direct-liquid fuel cell is disposed so that the cation-exchange membrane layer of low water content type A) faces an oxidant chamber side of the cell and the cation-exchange membrane layer of high water content type B) faces a fuel chamber side of the cell.

* * * * *